United States Patent [19]

Michel

[11] Patent Number: 4,461,611
[45] Date of Patent: Jul. 24, 1984

[54] HELICOPTER ROTOR WITH BLADE TRAILING EDGE TABS RESPONSIVE TO CONTROL SYSTEM LOADING

[75] Inventor: Philip L. Michel, Newtown, Conn.

[73] Assignee: United Technologies Corporation, Hartford, Conn.

[21] Appl. No.: 380,454

[22] Filed: May 20, 1982

[51] Int. Cl.³ .............................................. B64C 27/44
[52] U.S. Cl. ...................................... 416/24; 416/31; 416/98
[58] Field of Search ...................... 416/31, 23, 24, 98, 416/104; 244/17.11

[56] References Cited

U.S. PATENT DOCUMENTS

| 2,627,929 | 2/1953 | Sikorsky | 416/104 |
| 2,642,143 | 6/1953 | Miller | 416/24 |
| 2,776,718 | 1/1957 | Zuck | 416/24 |
| 2,818,123 | 12/1957 | Hiller | 416/24 |
| 3,213,944 | 10/1965 | Nichols et al. | 416/24 X |
| 3,589,831 | 6/1971 | Lemnios et al. | 416/24 |

FOREIGN PATENT DOCUMENTS

| 1044232 | 11/1953 | France | 416/104 |
| 1213809 | 11/1959 | France | 416/24 |

Primary Examiner—Everette A. Powell, Jr.
Attorney, Agent, or Firm—Vernon F. Hauschild

[57] ABSTRACT

A helicopter rotor having blade trailing edge tabs which are actuated in response to control rod loading to reduce or cancel the blade pitching moments imposed upon the blade and hence the control rods by blade aerodynamic and inertial loads, or other loads, encountered during rotor operation.

4 Claims, 8 Drawing Figures

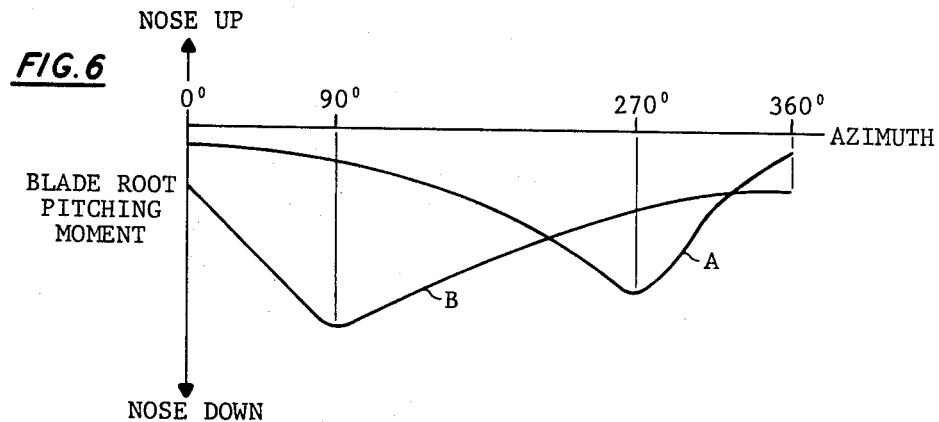
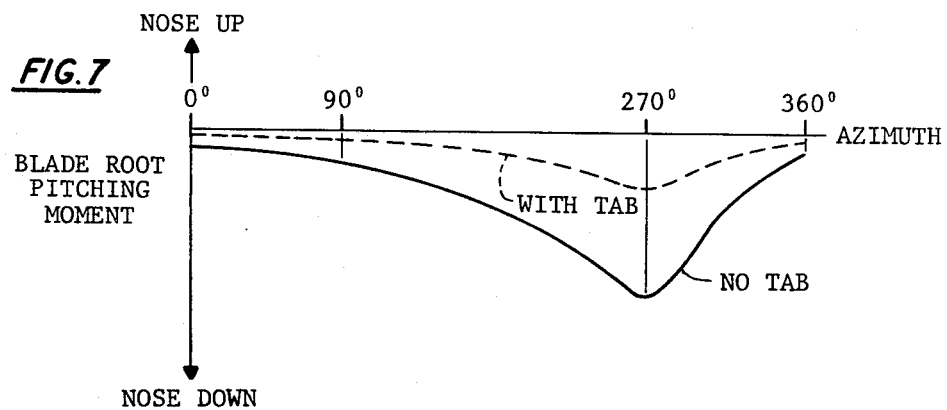
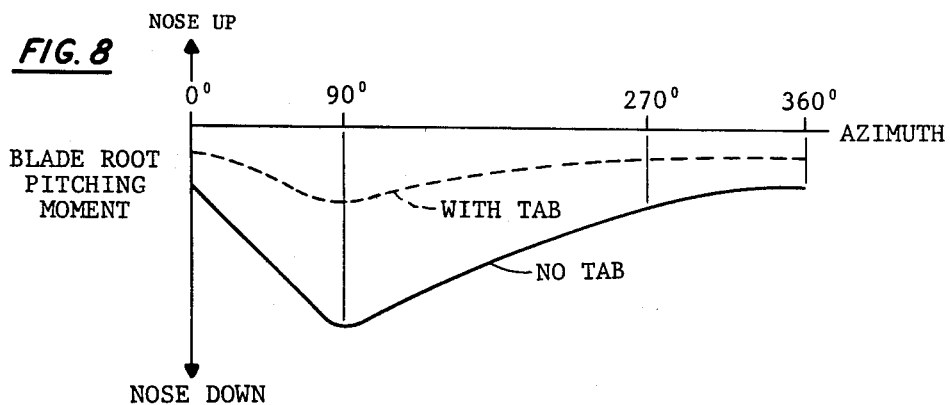

HELICOPTER ROTOR WITH BLADE TRAILING EDGE TABS RESPONSIVE TO CONTROL SYSTEM LOADING

DESCRIPTION

1. Technical Field

This invention relates to helicopter rotors and more particularly to such helicopter rotors in which the loads imposed upon the rotor blade pitch controls are reduced or eliminated by blade trailing edge tabs which deflect as a function of pitch control rod loading in a direction to generate blade pitching moments which reduce or cancel the blade pitching moments generated by blade aerodynamic and inertial loading during rotor operation.

2. Background Art

While trailing edge tabs have been used on helicopter blades in the past, no known prior art positions the trailing edge tabs as a function of control rod loading so as to cancel or reduce the control rod loading which would otherwise be caused by blade pitching moments.

DISCLOSURE OF INVENTION

A primary object of the present invention is to reduce the loading on the pitch control mechanism of a helicopter by using blade trailing edge tabs which deflect as a function of pitch control system loading to reduce or eliminate the control system loading caused by blade pitching moments generated during rotor operation by blade aerodynamic and inertial loading.

Use of the present invention will produce an improved helicopter with reduced control loads and will not only reduce the pitch control system and support structure weight, but will also permit operation of the helicopter at higher flight speeds than would otherwise be the case and will permit the use of highly cambered or transonic airfoils in blades to improve the rotor lift-to-drag ratio.

Other features and advantages will be apparent from the specification and claims and from the accompanying drawings which illustrate an embodiment of the invention.

BRIEF DESCRIPTION OF DRAWINGS

FIG. 6 is a graph of pitching moment coefficient plotted against blade azimuth wherein Curve A represents the blade of FIG. 4 and Curve B represents the blade of FIG. 5.

FIG. 7 depicts Curve A of FIG. 6 in full line form and depicts in phantom line form the effects of the use of a tuned tab deflecting according to this invention.

FIG. 8 depicts Curve B of FIG. 6 in full line form and depicts in phantom line form the effects of the use of a tuned tab deflecting according to this invention.

BEST MODE FOR CARRYING OUT THE INVENTION

Figure 1:
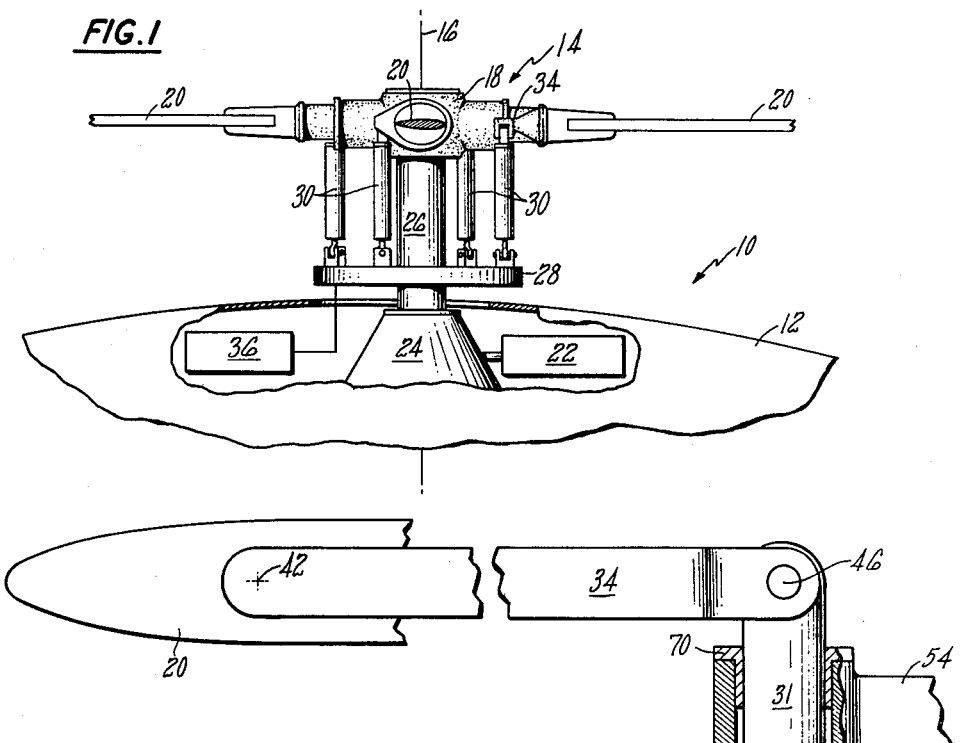
FIG. 1 is a schematic showing of a modern helicopter, showing a portion of the fuselage thereof, partially broken away, and a portion of the rotor thereof to illustrate the environment of my invention.

Referring to FIG. 1, we see a schematic drawing of a portion of a helicopter 10 which includes fuselage 12, shown broken away, supporting helicopter rotor 14 for rotary motion about axis of rotation 16. Rotor 14 comprises rotor hub 18 and rotor blades 20. Blades 20 project substantially radially from and rotate with hub 18 about axis 16 in conventional fashion and are supported from hub 18 for pitch change motion with respect thereto. Rotor 14 is driven in rotation by engine 22 which drives through transmission 24 to drive rotor drive shaft 26 and hence rotor 14.

Conventional swashplate 28 is connected to each blade through a control rod 30. The lower end of control rod 30 is universally connected to the swashplate 28 at ball point connection 32 so that blades 20 can be caused to change in pitch collectively or cyclically as conventional control 36 causes swashplate to either translate along and/or tilt with respect to shaft 26. The upper end of control rod 30 is adapted to receive motion conversion shaft 31 which is pivotally connected to pitch horn 34. FIG. 1 is purely representative of current-day helicopter construction and is included to permit a general description of helicopter construction and operation by way of background. The details of the FIG. 1 construction may be as shown in U.S. Pat. Nos. 2,979,968; 2,957,527; and 2,720,271.

The loads imposed upon helicopter pitch control systems in modern helicopters are substantial--in fact, it is generally necessary in helicopters of reasonable size to provide a servo mechanism in the rotor blade control system to feather the blades. This servo system is needed to amplify the mechanical input which the pilot imparts to the control system manually. This requirement results from the fact that the blade pitching moments due to both mass or inertial forces and aerodynamic forces acting on the blade become excessive with regard to the pilot's ability to supply control force input manually. In addition, it is generally found that large control forces or blade feathering moments are encountered when the rotor approaches flight conditions in which the retreating blade begins to stall. As a result of the large increases in blade pitching or feathering moments encountered as the retreating blade stall condition is approached, it becomes necessary to limit the maximum forward speed of the helicopter in order to avoid structural or fatigue failures in the control system members. An alternative would be to design the members of the pitch control system to sustain very large vibratory loads, but this has the disadvantage of increasing the weight of the control system components substantially. It is, accordingly, a basic object of my improved helicopter rotor to provide a means of maintaining blade feathering or pitching moments at a low level at all blade azimuth positions for any flight speed including speeds at which considerable blade stall is encountered.

In addition, the selection of airfoil shapes for helicopter main rotor blades is constrained to the use of symmetric airfoils or airfoils of less than 2 percent camber to avoid the large vibratory control system loads which occur when airfoils or larger camber are used. The elimination of this constraint through use of my invention will permit use of airfoils with higher camber in which the design lift coefficient is selected to increase rotor lift-to-drag ratio. This will permit reduced blade area and, for a given area, will yield higher maneuvering load factors. In the alternative, for a given blade area, the rotor tip speed may be reduced and thereby reduce rotor noise.

Figure 2:
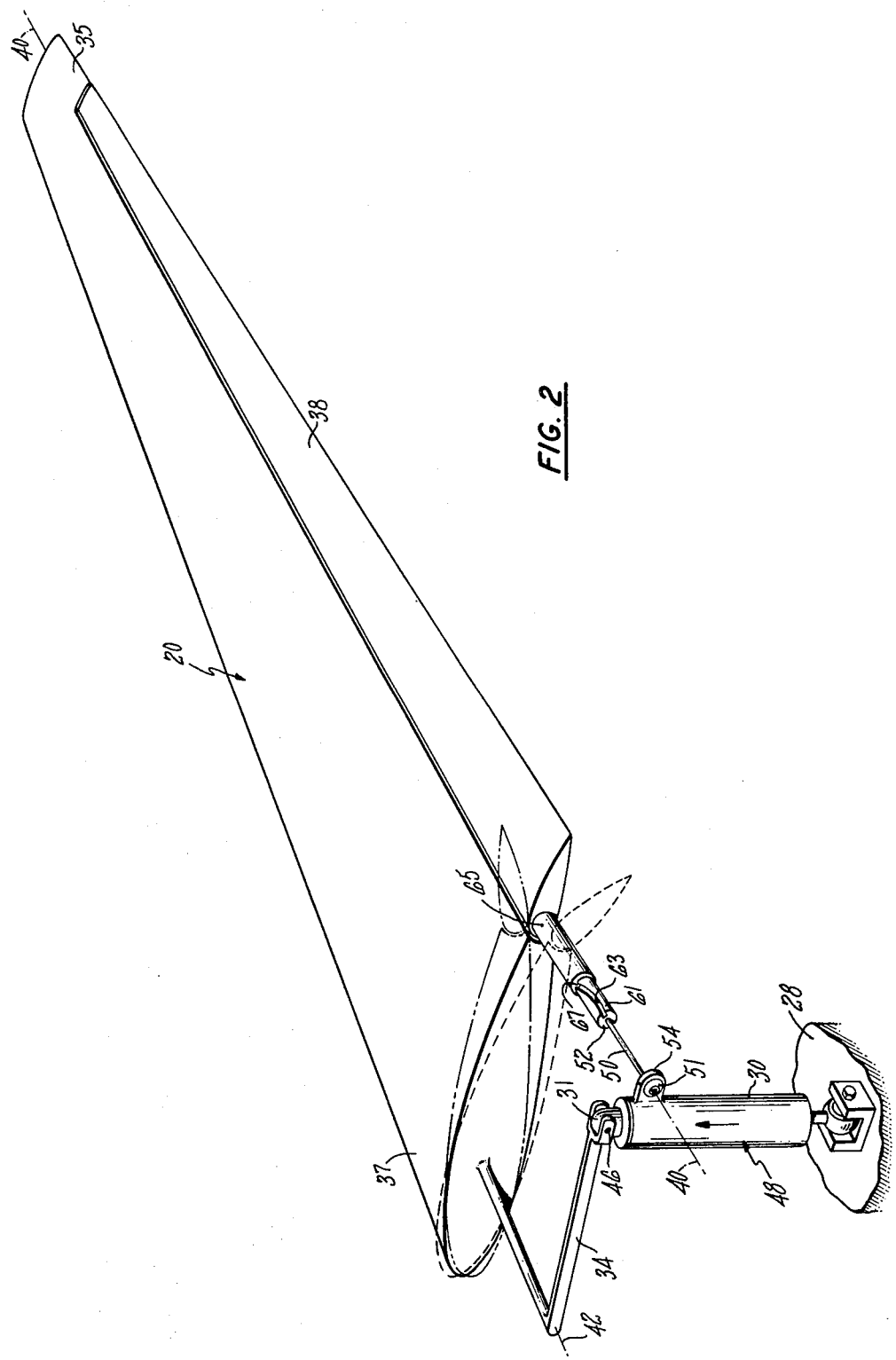
FIG. 2 is a partial showing of one of the helicopter blades of my rotor utilizing my invention to cause trailing edge flap deflection in response to and in proportion to control rod loading so as to relieve the control rod loading.

For a better understanding of my reduced load control system for helicopter rotors, reference is now made to FIG. 2. For purposes of illustration, FIG. 2 shows a helicopter blade 20 which is conventionally mounted for rotation as part of helicopter rotor 14 and which includes at least one trailing edge flap or tab 38 extending along the blade span and mounted for pivot action with respect to the blade 20 about spanwise extending axis 40, which is essentially parallel to blade pitch change axis 42. Trailing edge flap 38 is positioned between blade tip end 35 and blade root end 37 and is shaped so as to form the trailing edge of blade 20 and to cooperate with the remainder of the blade to define the cross sectional airfoil shape of the blade and comprises approximately 5 percent of the total blade chord. Trailing edge flap 38 moves with the remainder of blade 20 and is pivotable with respect thereto between its trailing edge down position shown in dotted lines in FIG. 2 and the trailing edge up position shown in phantom in FIG. 2. Suitable mechanism is provided to actuate the tab 38 in the proper direction to solve the problem of concern.

Blade pitch control horn 34 is connected in conventional fashion to helicopter blade 20 so that pivot motion of control horn 34 about pitch axis 42 will cause pitch change motion of blade 20 about pitch axis 42. Motion conversion shaft 31 is connected to control horn 34 at pivot joint 46. Accordingly, as control rod 30 moves vertically as shown in FIG. 2, control horn 34 is caused to pivot and, in turn, causes blade 20 to pivot about pitch axis 42. In a manner to be described in greater particularity hereinafter, motion conversion shaft 31 is connected to control rod 30 through first translation-to-rotation motion converting means 48. Shaft 50 is connected to motion converter assembly 48 by means of ball joint 51 at ear 54 extending from the upper end of control rod 30 and is caused to translate thereby substantially along axis 40. Second translation-to-rotation motion converting means 52 joins shaft 50 to tab 38 so that translation of shaft 50 causes rotation of tab 38.

As rotor 14 rotates about axis 16 in forward flight operation, both aerodynamic and inertial (mass) loads are imposed upon blade 20 which result in pitching moments which cause the blade to pitch about feathering axis 42 in either a clockwise or counter-clockwise direction. If, for example, the pitching moments cause blade 20 to rotate about feathering axis 42 in a counter-clockwise, nose-downward direction, the blade will move from its solid line FIG. 2 position to its phantom-line, nose-down position. The motion of shaft 31 relative to rod 30 is suitably limited in accordance with the maximum deflection range of tab 38. This pitch displacement, as illustrated in FIG. 2, will cause pitch horn 34 to pivot slightly counter-clockwise about pitch axis 42 and will cause motion converter means 48 to convert the translatory motion of joint 46 to rotational motion of motion converter ear 54 which results in the translation of shaft 50 to the left. Since shaft 50 is connected to trailing edge tab 38 by means of second motion converter assembly 52, translation of shaft 50 will cause an upward pivot motion of trailing edge flap 38 from its solid-line position shown in FIG. 2 to its phantom-line position. This pivot motion of trailing edge flap 38 will generate pitching moments in blade 20 which are equal and opposite to the pitching moments imparted to blade 20 by the aforementioned aerodynamic and inertial loads encountered during blade forward flight. The counteracting pitching moments generated by the pivoting of trailing edge flap 38 accordingly serves to relieve the control rod loading which was initially imposed thereon by blade pitching moments caused by blade aerodynamic and inertial loading during forward flight. Since, as described hereinafter, the output of converters 48 and 52 is proportional to control rod loads, tab 38 deflection will serve to reduce control rod loads.

Figure 3:
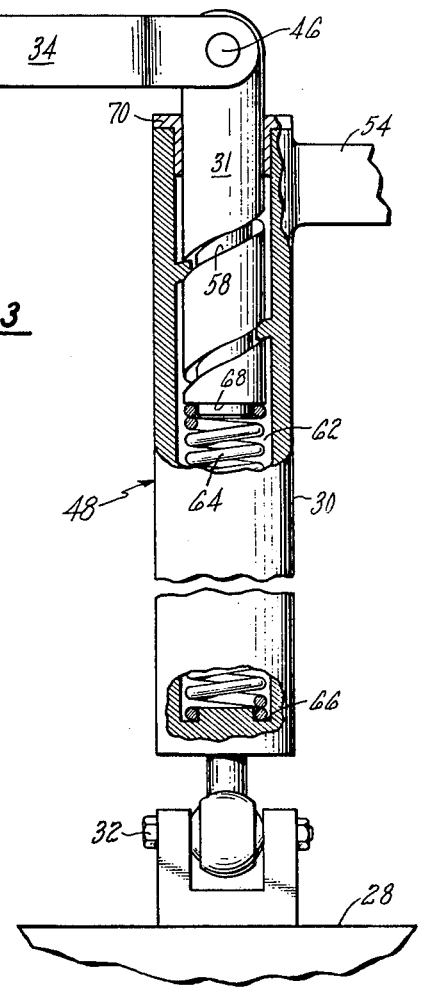
FIG. 3 is an enlarged showing of the special control rod used in my invention and its manner of connecting to the pitch horn and swashplate.

For a better understanding of the construction of translation-to-rotation motion conversion assembly 48, reference will be made to FIG. 3. As shown in FIG. 3, control rod 30 is universally connected to swashplate 28 by spherical bearing 32. Motion conversion shaft 31 includes helical threaded portion 58 which threadably engages the internal upper portion of control rod 30. The hollow interior of the lower portion of control rod 30 forms spring chamber 62 into which pre-loaded spring member 64 is positioned so as to operatively extend between control rod 30 by engaging base surface 66 thereof and pitch horn 34 by engaging surface 68 of motion conversion shaft 31, which forms part of pivotal connection 46 between pitch horn 34 and control rod 30. Bushing 70 is sleeved into the bore of control rod 30 as a positioning guide therefor, while permitting shaft 31 to be rotatable relative to rod 30. By viewing the FIG. 3 construction, it will be seen that as pitching moments, for example, in a nose-down direction, are applied to blade 20 by blade aerodynamic and inertial loading during rotor operation, blade 20 will pitch nose downwardly about feathering axis 42, and such will cause pitch horn 34 to rotate slightly in a counter-clockwise direction, thereby causing shaft 31 to move upward and to rotate control rod 30. The rotation of flange 54 causes shaft 50 (see FIG. 2) to move leftwardly in a direction away from the blade tip and toward the blade root. Similarly, if the pitching moments applied to blade 20 were to cause the blade to pitch nose upward, spring 64 would be compressed, and the downward motion of shaft 31 will cause rotation of control rod 30 in the opposite direction which would apply an opposite motion to shaft 50 (rightwardly in FIG. 2). Tab 38 would then be pivoted downward into the dotted-line position illustrated in FIG. 2.

The rate of spring 64 is selected to provide the desired tab deflection for a given pitching moment.

The second translation-to-rotation motion conversion apparatus 52 will best be understood by viewing FIG. 2. As previously described, rigid shaft member 50 is caused to translate along axis 40 by the rotary action of first motion conversion assembly 48, which is responsive to the pitch moment loading of control rod 30. Rigid shaft 50 is enveloped by cam sleeve 61, which translates in along axis 40 with shaft 50, and which has helical groove 63 therein. Trailing edge tab 38 is supported for pivot motion about axis 40 by cam follower sleeve 65, which is in turn sleeved over cam sleeve 61, and which carries inwardly directed projection 67, which matingly engages helical groove 63 in cam sleeve 61 so that, as cam sleeve 61 translates along axis 40 with shaft 50, cam follower 65, and hence trailing edge tab 38, is caused to pivot about axis 40 so as to perform its control rod load relieving function. Therefore, motion of shaft 50 to the left will rotate sleeve 65 causing tab 38 to deflect to its upward phantom position. Cam follower 65 is supported by conventional supports (not shown) from blade 20 so as to be pivotable about but not translatable along axis 40. As presented, my configuration addresses in-plane motion and accommodates either lead or lag without introduction of an adverse coupling. With the arm of pitch horn 34 substantially soft in torsion and the provision of the ball joint 32 connection to the swashplate 28, blade inplane excursions will be accommodated without jamming or introducing tab deflection by inclining control rod 30 and slight twisting of pitch horn 34.

With the construction of FIGS. 2 and 3 in mind, it will be seen that by way of operation of my device, the loading on the control rod 30 is maintained within a reasonable range in that as blade 20 is caused to change pitch slightly due to aerodynamic and inertial blade loading during rotor operation, this pitch moment results in a small blade pitch displacement which imparts a load to control rod 30 to cause spring 64 to either compress or extend and also cause control rod 30 to rotate, resulting in translation of shaft 50 and pivot motion of trailing edge flaps 38 as a result of the action of motion converter 52 to thereby provide a cancelling or reducing blade pitching moment which cancels or reduces the aforementioned aerodynamically imposed pitching moments and hence reduces control rod loads.

It will be evident to those skilled in the art that the description of my control load relieving improvement has been described for conditions in which there has been no pilot input to the control rod but rather control rod loading due to blade pitching moments generated during flight.

It will also be realized that when there are pilot induced motions to the control rod 30, this will overcome the reaction of spring 64 and related parts to bring the blade to the pitch called for by the pilot input and thereafter, with the control rod otherwise fixed, my invention will continue to perform its control rod load reducing function as described above.

The manner and direction in which the trailing edge tabs 38 are to be programmed to actuate will depend upon the problem which the tabs are being used to solve. Directional motion in the motion conversion assemblies illustrated is a function of the pitch hand selected.

In many helicopters the aerodynamic pitching moments applied to the blade result in high loads in the control system. Significant blade nosedown pitching moments are produced from either of two sources.

Figure 4:
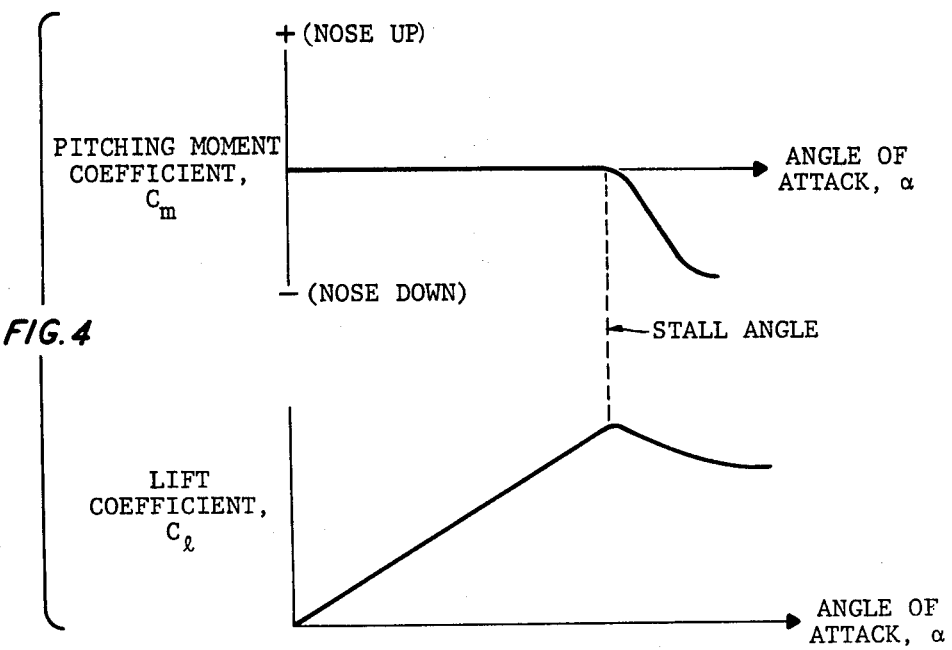
FIG. 4 is a graph of both pitching moment coefficient and lift coefficient plotted against helicopter blade angle of attack to illustrate the blade stall angle encountered without my deflectable trailing edge tab.

The first source is caused by blade stall. When the blade angle of attack exceeds the stall angle, the airflow separates, and a nosedown pitching moment results. This phenomenon typically occurs on the retreating blade. FIG. 4 illustrates the variation of blade pitching moment and lift coefficients plotted against angle of attack and shows the stall angle. The second source of high control loads producing a nosedown pitching moment results if the blades incorporate a significant camber and therefore have a nonzero pitching moment coefficient even below the stall angle. Cambered airfoils would be employed because they would permit the retreating blade to achieve high lift coefficients needed to avoid stall, but they create high pitching moments when they reach the point of the azimuth where velocity is greatest.

Figure 5:
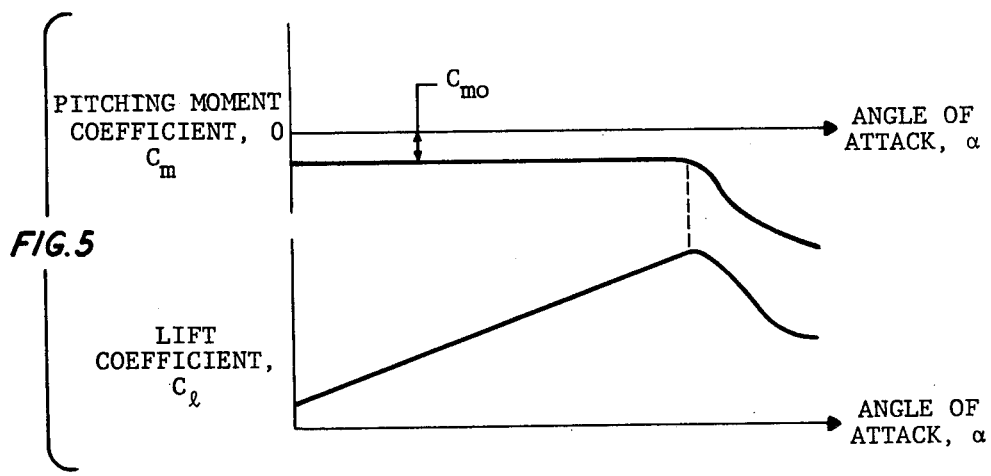
FIG. 5 is similar to FIG. 4 and presents a graph of both pitching moment coefficient and lift coefficient for cambered blades plotted against blade angle to attach illustrating the presence of a moment coefficient at all angles.

Similar to FIG. 4, FIG. 5 illustrates pitching moment and lift coefficients for a cambered airfoil and shows the below-stall pitching moment coefficient.

The control loads resulting from blade pitching moment can best be appreciated by examining FIG. 6. The case wherein the blade encounters stall is illustrated by Curve A. Nosedown pitching moments are experienced on the retreating blade and are imparted to the control system. The azimuthal variation of control loads produced on a blade with a cambered airfoil are illustrated by Curve B. In this case, the maximum nosedown blade moment is experienced on the advancing blade where the velocity of the airflow relative to the blade is the greatest. The advantage of trailing edge tabs which deflect as a function of control loads is illustrated in FIGS. 7 and 8 for the two cases included in FIG. 6. For the blade which produces high pitching moments due to stall (possibly a symmetrical blade), the tab is made to deflect trailing-edge-up in response to the measurement of nosedown pitching moment. The nosedown pitching moment is an indication of stall initiation. FIG. 7 shows the azimuthal variation in blade pitching moment with and without tab deflection.

For the advancing blade which suffers from high nosedown pitching moments because it has a highly cambered airfoil (Curve B of FIG. 6), the tab is made to deflect trailing edge up in response to nosedown moment measured at the root of the blade. This tab deflection scheme will reduce the pitching moment on the advancing blade. FIG. 8 illustrates the azimuthal variation in blade pitching moment for a rotor blade having significant camber with and without a deflectable trailing edge tab. It is felt that for flight conditions which avoid stall, tab deflection of this type can significantly reduce the control loads produced by a blade with a highly cambered airfoil.

I wish it to be understood that I do not desire to be limited to the exact details of construction shown and described, for obvious modifications will occur to a person skilled in the art.

I claim:

1. A helicopter having a rotor mounted for rotation about an axis of rotation and which rotor includes a hub and at least two rotor blades of airfoil cross-sectional shape extending substantially radially therefrom and supported for pitch change motion by the rotor hub, each of said blades having a trailing edge tab extending in a blade spanwise direction and supported therefrom for pivotal motion about an axis extending in a spanwise direction so as to vary the blade cross-sectional shape when pivoted and said tab being shaped to form the blade trailing edge for at least a portion of the blade span, blade pitch control means comprising a blade pitch horn connected to said blade so that motion of said pitch horn causes blade pitch variation, and a control rod connected to said pitch horn so that pilot actuation of said control rod will actuate said pitch horn and thereby vary blade pitch, and further so that during rotor operation with said control rod fixed in position, aerodynamic and inertial loads imposed upon said blade will cause blade pitching moments which, in turn, impose loads upon said control rod, and continuously operative tab control means operatively associated with said control rod so as to be overridden by pilot actuation of said control rod and also so as to cause said tab to pivot in response to said blade pitching moments imposed control rod loads to effect trailing edge tab pivot motion in a direction to relieve said blade pitching moments and hence said control rod loads.

2. A helicopter according to claim 1 wherein said tab control means comprises:

first translation-to-rotation motion converting apparatus operatively connecting said pitch horn to said control rod and having an axially movable shaft member aligned with said control rod so that translation motion of the pitch horn will result in rotation of said control rod as a function of control rod loading, a shaft member extending from said trailing edge tab and connected to said control rod so that rotation of said control rod will result in translation of said shaft member, and second translation-to-rotation motion converting apparatus connecting said shaft member to said trailing edge tab so that said translation of said shaft member will result in pivot motion of said trailing edge tab as a function of control rod loading and in a direction to cancel aerodynamically and inertially imposed blade pitching moments.

3. A helicopter according to claim 2 wherein said blade pitch control means includes a spring member operatively associated with said control rod and said axially movable shaft and having a predetermined rate so that said pitching moments imposed upon said blade during rotor operation due to blade aerodynamic and inertial loading will result in motion of said axially movable shaft relative to said control rod to cause repositioning of said trailing edge tab.

4. A helicopter according to claim 2 wherein said first and second motion converting means include helical cam-and-follower members.

* * * * *